United States Patent

[11] 3,633,966

[72] Inventors Peter C. Epple
Harper Woods;
Alan D. Berg, Washington, both of Mich.
[21] Appl. No. 16,281
[22] Filed Mar. 4, 1970
[45] Patented Jan. 11, 1972
[73] Assignee General Motors Corporation
Detroit, Mich.

[54] VEHICLE PASSENGER RESTRAINT SYSTEM
8 Claims, 6 Drawing Figs.
[52] U.S. Cl. ..................................... 297/386,
188/275, 188/317
[51] Int. Cl. ...................................... A47c 31/00,
A47d 15/00, B60r 21/10
[50] Field of Search ............................. 297/386;
188/88.505, 96.51, 96.5, 103

[56] References Cited
UNITED STATES PATENTS
2,327,295   8/1943   Whisler ...................... 188/88.505

3,109,418   11/1963   Exline et al. .................. 188/96.5
3,484,134   12/1969   Townsend ..................... 297/386

Primary Examiner—Paul R. Gilliam
Attorneys—W. E. Finken and D. L. Ellis

ABSTRACT: The kinetic energy of a vehicle passenger upon sudden deceleration of the vehicle is converted partially into potential energy in an elastically deformed belt, the ends of which are attached to the vehicle and restrained by an energy releasing anchor and a conventional anchor. The energy releasing anchor includes a cylinder connected to the vehicle and a piston rod having one end connected to the belt and having a piston on the other end thereof moveable in the cylinder. A compressible fluid captured in a chamber formed by the piston, piston rod and cylinder resiliently resists movement of the rod as the belt elastically deforms under a tensile force applied thereto, while triggering means on the piston detects initial contraction of the belt and releases the compressed fluid thus releasing the potential energy of the fluid and of the belt before any significant amount thereof can be transformed back into passenger kinetic energy.

INVENTORS.
Peter C. Epple, &
BY Alan D. Berg

D. L. Ellis
ATTORNEY

PATENTED JAN 11 1972

INVENTORS
Peter C. Epple, &
BY Alan D. Berg

D. L. Ellis
ATTORNEY

VEHICLE PASSENGER RESTRAINT SYSTEM

This invention relates generally to vehicle passenger restraint systems and more particularly to means for releasing potential energy of a belt member in the restraint system occasioned by movement of a passenger relative to the vehicle during abrupt deceleration of the vehicle.

Passenger restraint systems in modern automotive vehicles typically include restraining belts having ends anchored to rigid portions of the vehicle body structure. The restraining belts are typically fabricated from woven fibers to provide a belt having the flexibility required for passenger comfort and inherently exhibit a certain degree of elasticity due to the weaving pattern of the belt fibers and the characteristics of the fiber material. Consequently, as the vehicle body structure is rapidly decelerated, as during a collision, and the passenger imparts a force to the belt, the latter is elastically deformed between its ends as the kinetic energy of the passenger is transformed into potential energy in the elastically deformed belt.

In a passenger restraint system according to this invention, an anchor for the belt is provided which functions first as a spring to cushion the deceleration of the passenger and to transform a portion of the passenger kinetic energy into spring potential energy, and secondly as an energy releasing member which detects through changes in belt tension the proper instant at which to activate itself so as to release substantially all belt potential energy before any significant amount thereof can be transformed into passenger kinetic energy.

The primary feature, then, of this invention is that it provides an improved vehicle passenger restraint system including restraint belts and new and improved means for anchoring the ends thereof to rigid portions of the vehicle structure. Yet another feature of the invention resides in the provision of a restraint belt anchoring means which functions as a relatively strong spring cushioning the deceleration of the passenger and which further detects maximum belt deformation and thereafter activates to release substantially all of the potential energy of the belt before such energy can act on the passenger. Still another feature of this invention resides in the provision in the restraint belt anchoring means of a housing having a seal member therein with triggering means thereon, which seal member forms part of a relatively strong spring by capturing a volume of compressible fluid within the housing which cushions or resiliently resists movement of the seal member relative to the housing and which triggering means are operable to release stored energy in the fluid and permit unimpeded movement of the seal member. A still further feature of this invention resides in the provision in the triggering means of a member moveable relative to the housing and the seal means which member maintains in blocked condition a plurality of relief orifices in the seal means during movement of the latter in one direction and which member permits unblocking of the orifices upon momentary movement of the seal means in the opposite direction.

These and other features of this invention will be readily apparent from the following specification and from the drawings wherein.

Figure 1:
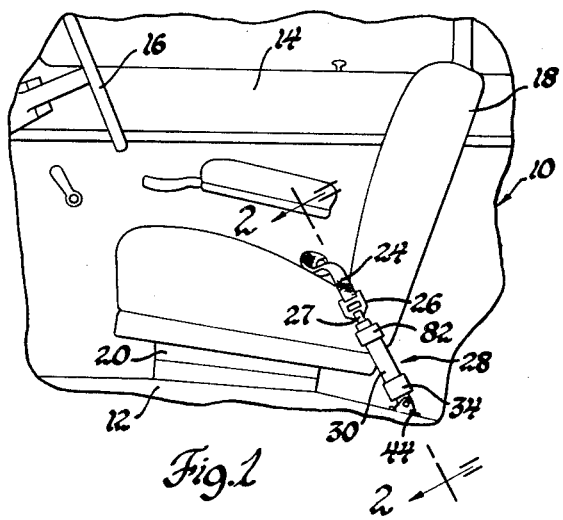
FIG. 1 is a fragmentary side elevational view of an automobile-type vehicle having a passenger restraint system according to this invention.

Referring now to FIG. 1 of the drawings, an automobile-type vehicle includes a body designated generally as 10 and provided with rigid floor structure 12. A pair of front doors are swingably mounted on body 10 in a conventional manner, only right front door 14 being shown. A conventional steering column and wheel assembly 16 is mounted on the body and a front seat structure 18 is conventionally secured to the floor structure 12 by seat adjusters 20. A vehicle passenger restraint system according to this invention includes a belt member 24 having an attaching clip 26 secured at one end thereof. The belt member 24 is of conventional woven fiber construction and is attachable to a similar belt member, not shown, through a conventional buckle which similar belt member has one end anchored to the floor structure 12 by conventional seat belt anchorage means, not shown. The clip 26 having an integral internally threaded cylindrical extension 27 is connected to the vehicle floor structure 12 as described hereinafter through an energy releasing anchor generally designated 28.

Figure 2:
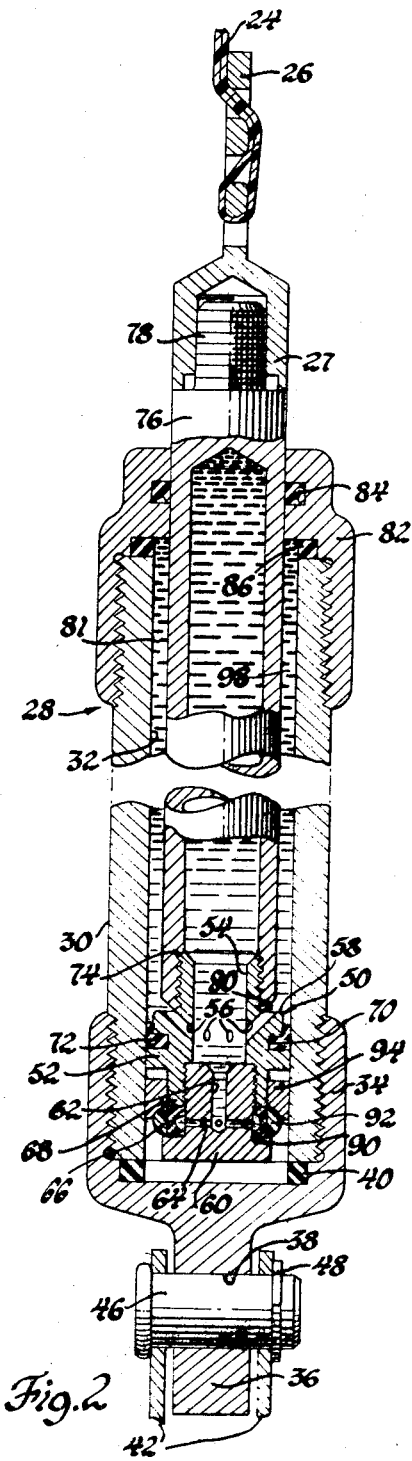
FIG. 2 is an enlarged sectional view taken generally along the plane indicated by lines 2—2 in FIG. 1 and showing the energy releasing anchor in a retracted condition.
Figure 4:
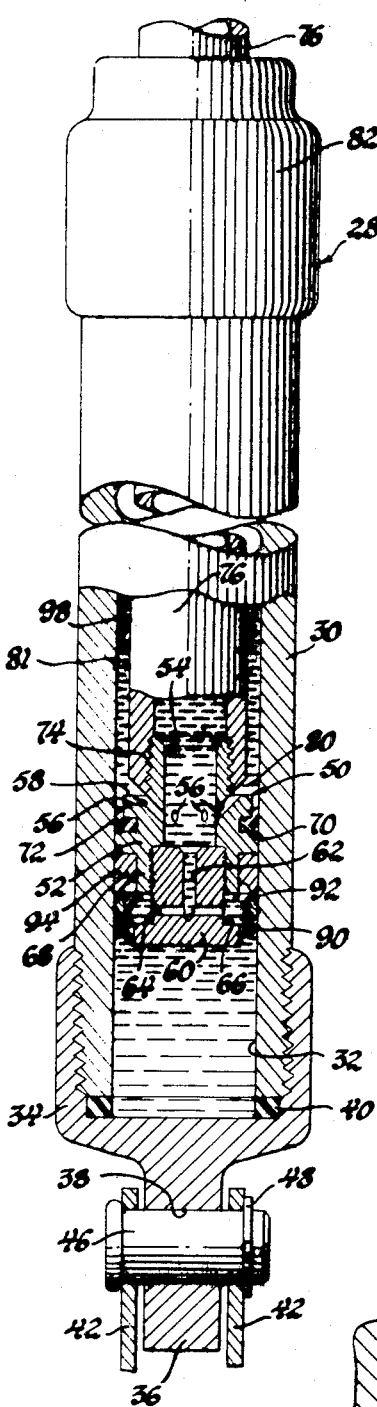
FIG. 4 is similar to FIG. 2 but showing the energy releasing anchor in an extended and depressurizing condition.

With reference now to FIGS. 1 and 2 of the drawings, energy releasing anchor 28 includes a housing in the form of a cylinder 30 having an internal bore 32 and external threads at either end thereof. An internally threaded cap 34 having an integral web 36 with bore 38 therethrough is threadedly received on the lower end of the cylinder 30 with a sealing ring 40 therebetween to close the lower end of the cylinder. Bore 38 in integral web 36 registers with aligned apertures in upstanding flanges 42 of a mounting bracket 44 fixedly secured to the floor structure 12, as by welding, and a headed pivot pin 46 extends through the registered bore and apertures and is retained in position by a retaining ring 48 seated in a groove in the pin. Pivot pin 46 thereby mounts the cylinder 30 on the floor structure 12 for pivotal movement generally in the plane of integral web 36.

Figure 5:
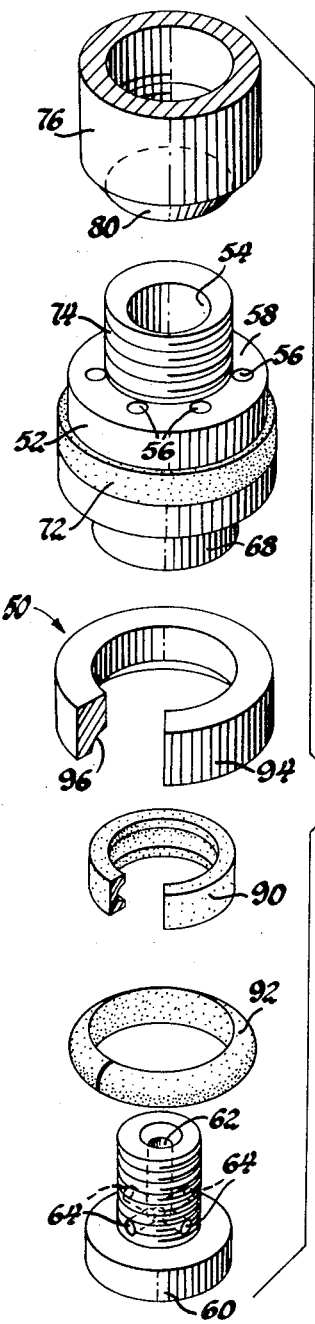
FIG. 5 is an exploded perspective view of the seal means and triggering means.

Referring now to FIGS. 2 and 5, seal means generally designated 50 are mounted in internal bore 32 of cylinder 30 for movement relative thereto between a retracted position, FIG. 2, and a plurality of extended positions along internal bore 32. Seal means 50 includes a reaction member or piston 52 having a central bore 54 therethrough and a plurality of relief passages 56 extending from a shoulder 58 thereof into central bore 54. The lower end of central bore 54 threadedly receives a plug 60 having an axial passage 62 and a plurality of radial passages 64 therein. The shank portion of the plug 60 is seated in the piston 52 to close the lower end of central bore 54 therein, FIG. 2. An annular groove 66 is defined between the piston and plug which groove communicates with central bore 54 through axial passage 62 and radial passages 64. Piston 52 further includes a sleeve bearing portion 68 and a second annular groove 70. Annular groove 70 receives a conventional sealing ring 72 which thereby divides internal bore 32 into two sealingly separated chambers of varying size depending upon the position of the piston 52.

A threaded neck portion 74 of the piston 52 threadedly receives the lower end of a generally hollow cylindrical rod 76 extending through housing 30 and having a threaded stud 78 projecting from the top thereof. The lower end of rod 76 is beveled at 80 so that when the lower end of the rod, FIG. 2, is seated on the shoulder 58 of the piston 52 the relief passages 56 are completely exposed to the upper annular volume or chamber 81 defined between the outer diameter of the rod 76 and the internal bore 32 of the housing 30. The outer diameter of the rod 76 slidably and sealingly receives a threaded cap 82 having a sealing ring 84 therein. Cap 82 is threadedly received on the upper end of cylinder 30 with a sealing ring 86 therebetween to seal the upper end of the cylinder while permitting bodily shiftable movement of rod 76 and reciprocation of piston 52 within the cylinder. The stud 78 on rod 76 threadedly receives the cylindrical extension 27 of the clip 26 to thereby attach the belt member 24 to the floor structure 12 through the energy-releasing anchor.

Blocking means are provided on the piston 52 for selectively closing the ends of radial passages 64 in the plug and include a blocking ring 90 of generally C-shaped cross section fabricated from a flexible material, such as rubber, a split holding ring 92 of D-shaped cross section fabricated from a flexible material, such as nylon, and a reinforcing member in the form of a metal sleeve 94 having an internal arcuate shoulder 96 at one end thereof, FIG. 5. The blocking ring 90 is received in first annular groove 66 to close the radial passages 64 in plug 60. The holding ring 92 surrounds blocking ring 90 and is, in turn, restrained against radial expansion by the arcuate shoulder 96 of the sleeve 94 abutting approximately one-half of the curved surface of the D-shaped holding ring 92, FIG. 6. The outer diameter of the sleeve 94 is generally equal to the diameter of bore 32 of the housing 30 so that when inserted in bore 32 a slight friction fit is achieved between the sleeve and the bore.

A compressible fluid medium 98 is introduced into the chamber 81 and the internal bore of the rod 76 so as to completely fill the volume above and within the piston 52 including axial and radial passages 62 and 64 and the volume enclosed by blocking ring 90, the piston 52 occupying the retracted position, FIG. 2, and the compressible fluid, when a liquid, normally exerting little or no pressure on the piston. In practice a relatively compressible liquid such as dimethyl polysiloxane fluid, marketed by the Dow Corning Company under the trade name of F-4029 FLuid, has proved satisfactory for use in the manner to be described hereinafter.

Figure 6:
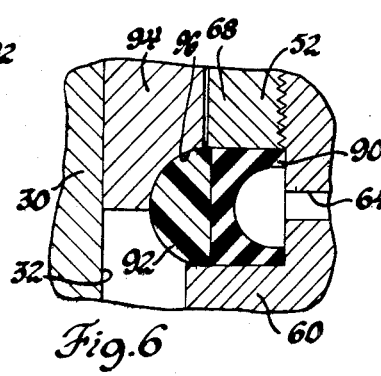
FIG. 6 is an enlarged view of a portion of FIG. 2.

With reference now to FIGS. 1, 2, 3 and 4, under normal operating conditions a passenger would occupy seat structure 18 with the belt members of the lap belt assembly buckled together in a conventional manner. Piston 52 normally is resiliently maintained in the retracted position by the compressible fluid medium 98, FIG. 2, and may be additionally retained in the retracted position by a frangible connection, such as a pin, not shown, to prevent inadvertent activation of the anchoring means under minor shocks normally experienced in everyday use of the vehicle. Upon more severe impact, as in a collision, the vehicle body generally decelerates more rapidly than the passenger and accordingly the passenger, moving relative to the body, imposes an inertia force on the buckled belts of the lap belt assembly creating tension in belt 24. This tension initiates upward movement of the rod 76 and piston 52 toward an intermediate position, FIG. 3, compressing fluid medium 98. As best seen in FIG. 6, the head portion of plug 60 contacts holding ring 92 to thus carry the latter upwardly as a unit with the piston. The holding ring, in turn, engaging the sleeve 94 around the arcuate shoulder 96 of the latter, carries the sleeve upward while the sleeve radially reinforces the holding ring against the increasing pressure exerted on the blocking ring 90 and on the holding ring by the fluid medium as the latter is compressed by the rising piston. The anchoring means 28 thus functions as a fluid spring resiliently resisting movement of the end of the belt member 24 and transforming a portion of the kinetic energy of the passenger into potential energy in the compressed fluid medium 98.

As the end of belt member 24 exerts a tensile force on the rod 76, the rod, of course, exerts an equal and opposite tensile force on the end of the belt member which force is resisted by the decelerating mass of the passenger. The tensile forces on the belt member applied at both anchoring locations, however, tend to elastically deform the belts so that still more of the kinetic energy of the passenger is transformed into potential energy, more particularly potential energy in the elastically deformed belt members. The energy transformation as recited hereinbefore continues until the mass of the passenger has zero kinetic energy or velocity relative to the vehicle body, at which instant the piston 52 assumes the intermediate position shown in FIG. 3 and the tensile force in the belts and the passenger's deceleration is maximum. The tensile force exerted by the elastically deformed belt members is borne by both the conventional floor anchorage, not shown, on the other belt and the energy releasing anchor 28 for belt 24 in which latter pressure exerted by the compressed fluid medium 98 on the piston balances the force exerted on the rod by the belt member 24.

Figure 3:
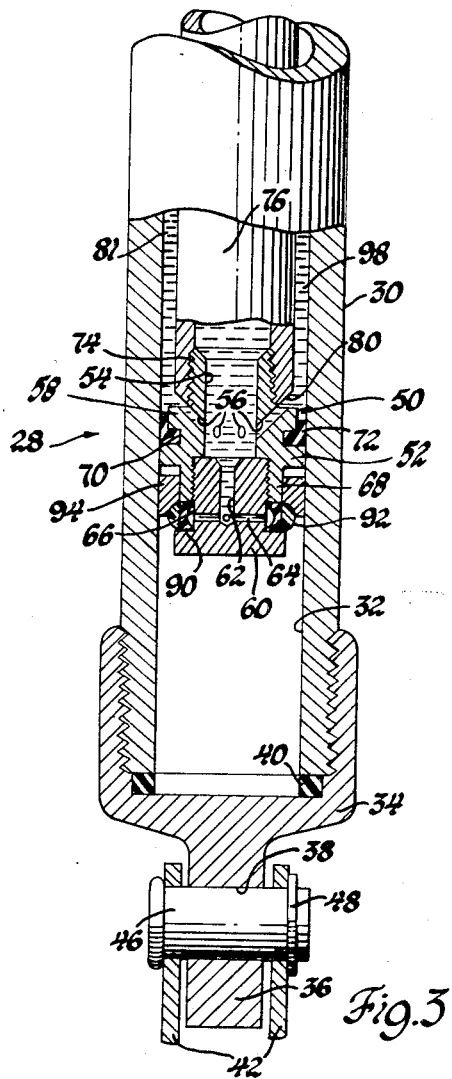
FIG. 3 is similar to FIG. 2 and showing the energy releasing anchor in an extended pressurized condition.

At the instant subsequent to the instant of maximum deceleration and zero relative velocity, indicated in FIG. 3, the elastically deformed belts begin to contract, exerting an initially high but diminishing force on the mass of the passenger tending to move the passenger in the opposite direction. The elastically deformed belts, of course, have a spring rate which dictates that as the stretched length of the belt decreases so also does the tensile force exerted thereby on the rod 76 and the conventional anchorage. Therefore, as the belt members begin their contraction the tensile force exerted by belt 24 on the rod 76 diminishes and for a brief instant creates an unbalance between the force exerted by the compressed fluid medium on the piston and the opposite force exerted on the rod by the belt member 24, with the former exceeding the latter. Under the instantaneous unbalance, the pressure of the fluid medium forces the piston 52 downward to the position of FIG. 4 while the frictional engagement between the bore 32 and the sleeve 94 maintains the sleeve fixed relative to the cylinder. As the belts continue to contract, the piston continues to move downward relative to sleeve 94 and the arcuate shoulder 96 separates from the holding ring 92 so that the radial reinforcement on the holding ring 92 previously resisting the fluid pressure on the blocking ring 90 is removed. As the reinforcement is removed from the holding ring, the fluid radially expands both the holding ring and the blocking ring until a lip portion of the latter is forced over the edge of annular groove 66, FIG. 4, thereby unblocking the radial passages 64 in plug 60.

With the radial passages thus unblocked and the elastically deformed belt members and compressed fluid medium still possessing substantially all the potential energy gained during passenger deceleration, the fluid medium is forced very rapidly from chamber 81 through passages 56, central bore 54 and the axial and radial passages 62 and 64 to the lower chamber of the housing 30. The rapidly flowing fluid medium thereby releases its potential energy, thereby rapidly decreasing the pressure of and the force exerted by the fluid medium on the upper side of the piston and creating a momentary unbalance between the tensile force exerted on the rod by the elastically deformed belt member 24 and the resisting force on the piston, the belt tensile force being significantly greater. With resistance at the end of belt member 24 virtually completely removed, the relatively low mass belts are permitted to contract very rapidly with the generally inert and relatively high mass of the passenger serving as an anchor so that the end of the belt member 24 is drawn upward. The rod 76 and piston 54 are permitted to move upwardly with the end of the belt free of any substantial fluid resistance by having the size and number of axial and radial passages 62 and 64 sufficient to prevent significant pressure buildup thereacross. The rod and piston thus move to an elevated position above that shown in FIG. 4. During the rapid contraction of the end of belt member 24, the passenger experiences no further reacceleration since there is nothing other than the passenger upon which the belt member 24 can react.

It will, of course, be understood that the spring rate of the liquid spring as described hereinbefore, is a function of the fluid medium used. The limiting factor, however, on the fluid medium is that it must be sufficiently compressible to permit, upon the recoil of or instantaneous force unbalance on the piston, substantial separation between arcuate shoulder 96 of the sleeve 94 and the holding ring 92. Should the sleeve not substantially separate from the holding ring, the latter will continue to maintain the blocking ring in position so that the energy releasing anchor will not trigger and will continue to function merely as a very high rate liquid spring. In practice, the dimethyl polysiloxane Dow Corning F-4029 Fluid has proved to have satisfactory compressibility for displacement of the piston when resisting a 2,800 lb. tensile force on the rod 76 while generating approximately 10,000 p.s.i. pressure within chamber 81.

The rapidity with which the lower end of elastically deformed belt member 24 is able to contract following unblocking of radial passages 64 is a function of the size of the passages and orifices through the piston and the volume of chamber 81. More particularly, once the blocking ring 90 has been expanded, FIG. 4, the passages 56, 62 and 64 must be sufficiently large to offer virtually no restriction to the passage of the fluid medium so that no significant pressure differential is maintained across the piston. Equally important, by keeping the volume of chamber 81 at a minimum, that is by using a rod 76 of outside diameter only slightly less than the diameter of bore 32 in the housing 30, very high pressure can be generated on a volume of fluid which can be completely exhausted from the annulus in a very brief instant, it being obvious to those skilled in the art that the smaller the total volume of fluid to be evacuated the smaller the passages through the piston can be made. In practice it has been found that a rod 76 having an outside diameter equal to a minimum of approximately 80 percent of the diameter of bore 32 provides a sufficiently small annulus 81.

It will be further understood by those skilled in the art that means other than a compressible fluid may be employed to impart resilient resistance to the end of the belt member 24 and that means other than a piston having blocking, holding and reinforcing members could be employed to detect belt contraction and thereafter actuate to release the stored energy of the resilient resilient means. More particularly, for example, it would be obvious to one skilled in the art to replace the compressible fluid with a coil-type spring directly connected at one end to the lower end of belt member 24. It would further be obvious to then anchor the other end of the coil spring to the vehicle floor structure 12 by frangible means and provide an actuator for fracturing the frangible means to release the spring which actuator would be responsive only to initial recoil of the resilient means associated with initial contraction of the elastically deformed belt member as described hereinbefore.

Having thus described the invention, what is claimed is:

1. An energy dissipating anchor comprising in combination, a housing having a generally cylindrical bore therein, a piston having a plurality of relief passages therethrough and an annular groove therein, said relief passages terminating in said annular groove, means mounting said piston in said cylindrical bore for movement relative thereto in two opposite directions, a generally cylindrical rod, means rigidly connecting one end of said rod to said piston for unitary movement therewith, means mounting said rod on said housing for bodily shiftable movement relative thereto in said two opposite directions, said rod and said piston defining a generally annular closed chamber in said cylindrical bore, a compressible liquid in said annular chamber, a blocking ring mounted in said annular groove on said piston and closing said relief passages, a holding ring surrounding said blocking ring, a sleeve having a reinforcing shoulder thereon, and means mounting said sleeve in said cylindrical bore for unitary movement with said piston in one of said two opposite directions and for movement relative thereto upon movement of said piston in the other of said two opposite directions, said reinforcing shoulder on said sleeve being operable during unitary movement of said sleeve and said piston in said one direction to maintain said blocking ring and said holding ring in said annular groove so that movement of said piston and said rod in said one direction is resiliently resisted by said compressible liquid and said compressible liquid thereafter being operable upon momentary movement of said piston and said rod in said other of said two opposite directions and upon substantial separation of said reinforcing shoulder and said holding ring to radially expand said blocking ring and said holding ring to permit substantially unrestricted flow of said compressible liquid out of said annular chamber thereby releasing substantially all of the potential energy of said compressible liquid.

2. An energy releasing anchor as recited in claim 1 wherein the outside diameter of said cylindrical rod is equal to at least 80 percent of the diameter of said cylindrical bore.

3. In a vehicle passenger restraint system, at least one elastically deformable belt member, means fixedly securing one end of said belt member to a rigid portion of said vehicle, a housing having a generally cylindrical bore therein, means closing one end of said cylindrical bore and pivotally mounting said housing on a rigid portion of said vehicle, a piston having a plurality of relief passages therethrough and an annular groove therein, means mounting said piston in said cylindrical bore for movement relative thereto in two opposite directions, a generally cylindrical rod having an outer diameter equal to at least 80 percent of the diameter of said cylindrical bore, means rigidly connecting one end of said rod to said piston for unitary movement therewith, means mounting said rod in said housing for bodily shiftable movement in said two opposite directions said piston and said rod defining a closed annular chamber in said housing, means fixedly securing the other end of said elastically deformable belt member to the other end of said rod, a compressible liquid in said annular chamber, a generally C-shaped blocking ring mounted in said annular groove in said piston and closing said relief passages, said blocking ring being radially expandable to open said relief passages, a holding ring surrounding said blocking ring, said holding ring being radially expandable to permit radial expansion of said blocking ring, a sleeve having an arcuate reinforcing shoulder thereon, and means mounting said sleeve in said cylindrical bore for sliding movement in one of said two opposite directions, said holding ring being engageable with said reinforcing shoulder on said sleeve to move said sleeve as a unit with said piston upon forced movement of said piston in said one direction under a tensile force applied to said belt member and elastically deforming the latter, said reinforcing shoulder being operable during such unitary movement to prevent radial expansion of said blocking and holding rings so that movement of said piston is resiliently resisted by said compressible liquid, and said compressible liquid thereafter being operable upon momentary movement of said piston and rod in the other of said two opposite directions and upon substantial separation of said reinforcing shoulder and said holding ring to radially expand said blocking and said holding rings to permit substantially unrestricted flow of said compressible liquid out of said annular chamber and substantially unimpeded movement of said piston in said one direction thereby releasing substantially all of the potential energy of said compressible liquid and said elastically deformed belt member.

4. In a vehicle passenger restraint system, the combination comprising, an elastically deformable belt connected to said vehicle and adapted to effect deceleration of the mass of a passenger in said vehicle concurrently with deceleration of said vehicle, a combination cushion and energy-releasing unit disposed between said vehicle and said belt including a housing and a reaction member supported on said housing for movement relative thereto in two opposite directions, one of said housing and said reaction member being connected to said belt and the other being connected to said vehicle such that forces exerted on said belt by said passenger during deceleration of said vehicle effect displacement of a portion of said belt relative to said vehicle and concurrent movement of said reaction member in one of said two opposite directions relative to said housing, a resilient medium disposed between said housing and said reaction member, means disposed between said resilient medium and said reaction member operative to establish therebetween in a restraining relationship whereby movement of said reaction member in said one direction relative to said housing is resisted by said resilient medium with concurrent elastic deformation thereof and storage therein of potential energy, said resilient medium thereby exerting a force on said belt resisting displacement of said portion thereof so that said belt is elastically deformed during deceleration of said passenger and a part of the kinetic energy of said passenger is transformed into stored potential energy in said deformed belt and in said deformed resilient medium, and triggering means operatively associated with said resilient medium and said reaction member responsive to initial movement of the latter in the other of said two opposite directions corresponding to initial rebound of said resilient medium and initial contraction of said belt to effect substantially instantaneous termination of said restraining relationship between said resilient medium and said reaction member thereby to release said potential energy of said belt and said resilient medium independently of said passenger.

5. An energy-releasing anchor comprising, in combination, a housing, a reaction member disposed on said housing for movement relative thereto in two opposite directions, means attached to said reaction member for moving the latter in one of said two opposite directions, a resilient medium disposed between said housing and said reaction member, means disposed between said resilient medium and said reaction member operative to establish therebetween a restraining relationship whereby movement of said reaction member in said one direction is resisted by said resilient medium with concurrent elastic deformation thereof and storage therein of potential energy, and triggering means operatively associated with said resilient medium and said reaction member responsive to initial movement of the latter in the other of said two opposite directions corresponding to initial rebound of said resilient medium to effect substantially instantaneous termination of said restraining relationship between said resilient medium and said reaction member thereby to release said stored potential energy independently of said reaction member.

6. An energy-releasing anchor comprising, in combination, a housing, a reaction member disposed on said housing for movement relative thereto in two opposite directions, one side of said reaction member cooperating with said housing in defining in the latter a closed chamber, means connected to said reaction member operative to move the latter in one of said two opposite directions effecting a reduction of the volume of said closed chamber a compressible fluid medium disposed in said closed chamber, passage means on said reaction member communicating the other side thereof with said closed chamber and adapted to permit substantially unrestricted flow of said fluid medium out of said closed chamber, blocking means disposed in said passage means operative to effect complete blocking of said passage means so that movement of said reaction member in said one direction is resiliently resisted by said fluid medium with concurrent compression thereof and consequent storage therein of potential energy, and triggering means associated with said blocking means responsive to initial movement of said reaction member in the other of said two opposite directions corresponding to initial rebound expansion of said compressed fluid medium to effect substantially instantaneous unblocking of said passage means thereby to release said stored potential energy independently of said reaction member.

7. An energy-releasing anchor comprising, in combination, a housing having a generally cylindrical bore therein, a piston disposed in said housing for bodily movement relative thereto in two opposite directions, one side of said piston cooperating with said housing in defining therein a closed chamber, a rod rigidly attached to said piston and operative to move said piston in one of said two opposite directions effecting a reduction of the volume of said closed chamber, a compressible fluid medium disposed in said closed chamber, passage means on said piston communicating the other side thereof with said closed chamber and adapted to permit substantially unrestricted flow of said fluid medium out of said closed chamber, blocking means disposed in said passage means operative to effect complete blocking of said passage means so that movement of said piston in said one direction is resiliently resisted by said fluid medium with concurrent compression thereof and consequent storage therein of potential energy, and triggering means associated with said blocking means responsive to initial movement of said piston in the other of said two opposite directions corresponding to initial rebound expansion of said compressed fluid medium to effect substantially instantaneous unblocking of said passage means thereby to release said stored potential energy independently of said piston.

8. An energy-releasing anchor comprising, in combination, a housing having a generally cylindrical bore therein, a piston disposed in said housing for bodily movement relative thereto in two opposite directions, one side of said piston cooperating with said housing in defining therein a closed chamber, a rod rigidly attached to said piston and operative to move the latter in one of said two opposite directions effecting a reduction of the volume of said closed chamber, a compressible liquid disposed in said closed chamber, means defining an annular groove in said piston, means defining a plurality of passages in said piston between said one side of the latter and said groove, said groove and said passages cooperating in communicating said closed chamber with the other side of said piston to permit substantially unrestricted flow of said compressible liquid out of said closed chamber, blocking means disposed in said annular groove and operative to effect complete blocking of said plurality of passages so that movement of said piston in said one direction is resiliently resisted by said liquid with concurrent compression thereof and consequent storage therein of potential energy, and a sleeve member disposed on said piston for unitary movement therewith in said one direction and for movement relative thereto in response to movement of said piston in the other of said two opposite directions, said sleeve engaging said blocking means to reinforce the latter against the pressure exerted thereon by said compressed liquid during movement of said piston in said one direction and releasing said blocking means in response to initial movement of said piston in said other direction corresponding to initial expansion rebound of said compressed liquid thereby to permit displacement of said blocking means from said groove by said compressed liquid and substantially instantaneous release of said stored potential energy independently of said piston.

* * * * *